US012563014B2

(12) United States Patent　　　　(10) Patent No.:　US 12,563,014 B2
Benameur et al.　　　　　　　　　(45) Date of Patent:　　　Feb. 24, 2026

(54) APPLICATION PROGRAMMING INTERFACE (API) SECURITY

(71) Applicant: NetApp, Inc., San Jose, CA (US)

(72) Inventors: Azzedine Benameur, Fairfax, VA (US); Yun Shen, Bristol (GB)

(73) Assignee: NetApp, Inc., San Jose, CA (US)

( * ) Notice: Subject to any disclaimer, the term of this patent is extended or adjusted under 35 U.S.C. 154(b) by 195 days.

(21) Appl. No.: 18/303,359

(22) Filed: Apr. 19, 2023

(65) Prior Publication Data

US 2024/0214348 A1　　Jun. 27, 2024

Related U.S. Application Data

(60) Provisional application No. 63/477,105, filed on Dec. 23, 2022.

(51) Int. Cl.
　　*H04L 9/40*　　　　(2022.01)
　　*G06F 9/54*　　　　(2006.01)
(52) U.S. Cl.
　　CPC .......... *H04L 63/0236* (2013.01); *G06F 9/547* (2013.01); *H04L 63/1425* (2013.01)
(58) Field of Classification Search
　　CPC .. H04L 63/0236; H04L 63/1425; G06F 9/547
　　USPC .......................................................... 726/12
　　See application file for complete search history.

(56) References Cited

U.S. PATENT DOCUMENTS

2020/0162503 A1*　5/2020　Shurtleff ............. G06F 11/3013
2020/0220875 A1*　7/2020　Harguindeguy ...... H04L 63/101

2022/0210172 A1*　6/2022　Tan ........................ G06F 21/554
2022/0382593 A1*　12/2022　Tootaghaj ........... G06F 9/45558
2023/0034344 A1*　2/2023　Jain .......................... G06N 3/04
2023/0337019 A1*　10/2023　Mehta .................... H04W 24/04
2024/0015092 A1*　1/2024　Griffin .................. H04L 45/302
2024/0126916 A1*　4/2024　Nguyen ................ G06F 21/602
2024/0129317 A1*　4/2024　Addaguduru ......... H04L 41/044

(Continued)

OTHER PUBLICATIONS

Amazon., "Amazon ECS," Run highly secure, reliable, and scalable containers. Retrieved from Internet URL: https://aws.amazon.com/ecs/.

(Continued)

*Primary Examiner* — David P Zarka
(74) *Attorney, Agent, or Firm* — Jaffery Watson Hamilton & DeSanctis LLP

(57)　　　　　　ABSTRACT

Systems and methods for enhancing API security by identifying anomalous activities in a cloud environment are provided. In one embodiment, the lack of awareness of an external API with respect to how calls to the external API may affect a cluster of a container orchestration platform is addressed. For instance, the views of the external and internal APIs may be combined to achieve better API security by correlating external API calls with undesirable behavior or other anomalies arising in the internal API. Responsive to identifying such undesirable behavior, information (e.g., a host, a source IP, a user, a specific payload) associated with the offending external API call may be added to a network security feature (e.g., a deny list, an IPS, or a WAF) utilized by the external API to facilitate performance of enhanced filtering of subsequent external API calls by the external API on behalf of the internal API.

20 Claims, 6 Drawing Sheets

100 ⸌

(56) References Cited

U.S. PATENT DOCUMENTS

2024/0193467 A1\*    6/2024    Vohra ..................... G06N 20/00

OTHER PUBLICATIONS

AWS., "Serverless API Security, Authentication, and Authorization on AWS," Retrieved from Internet URL: https://aws.amazon.com/graphql/api-security-auth/.

Axway., "4 types of APIs and what makes each one unique," Axway Blog, 2022. Retrieved from Internet URL: https://blog.axway.com/learning-center/apis/basics/different-types-apis#:~:text=Internal%20service%20APIs%20expose%20internal,services%20to%20bring%20additional%20value.

Bender J., "What Is Statistical Analysis?," Business News Daily, 2023. Retrieved from Internet URL: https://www.businessnewsdaily.com/6000-statistical-analysis.html.

Cloud Flare., "What is a WAF? | Web Application Firewall Explained," Cloud Flare. Retrieved from Internet URL: https://www.cloudflare.com/learning/ddos/glossary/web-application-firewall-waf/.

Comiskey C., "Track Your Cloud Activities Using IBM Cloud Activity Tracker with LogDNA," IBM Cloud, 2019, pp. 1-9. Retrieved from Internet URL: https://www.ibm.com/cloud/blog/track-your-cloud-activities-using-ibm-cloud-activity-tracker-with-logdna.

Elastic., "Modernize SecOps with Elastic Security," Elastic Security. Retrieved from Internet URL: https://www.elastic.co/security.

NetApp., "What is cloud analytics?," Cloud Services. Retrieved from Internet URL: https://www.netapp.com/cloud-services/what-is-cloud-analytics/#:~:text=Cloud%20analytics%20involves%20deployment%20of,in%20all%20sorts%20of%20ways.

Trend Micro Cloud One., "Configure Google Cloud Audit Logs to Track All Activities," Retrieved from Internet URL: https://www.trendmicro.com/cloudoneconformity/knowledge-base/gcp/CloudIAM/record-all-activities.html.

International Search Report and Written Opinion for Application No. PCT/US2023/085035, mailed on Apr. 3, 2024, 11 pages.

\* cited by examiner

100

Cloud System 120

Security Service 130

Feedback 131

Deny List 123

API Gateway 122

API 125

Cloud Resource 112n

Cloud Resource 128b

Cloud Resource 128a

Memory 126

Processor(s) 124

Network 110

External API Call 136

Customer 102a

Customer 102b

Customer 102n

APPLICATION PROGRAMMING INTERFACE (API) SECURITY

CROSS-REFERENCE TO RELATED APPLICATIONS

This application claims the benefit of priority of U.S. Provisional Application No. 63/477,105, filed Dec. 23, 2022, the contents of which are hereby incorporated by reference in their entirety for all purposes.

BACKGROUND

Field

Various embodiments of the present disclosure generally relate to cloud security. In particular, some embodiments relate to an approach for detecting and/or mitigating anomalies, security threats, and/or other risks by combining the view of an external application programming interface (API) (e.g., an API gateway of a cloud provider or an ingress controller of a container orchestration platform) and internal API activities.

Description of the Related Art

The cloud has ushered in a different way of developing and deploying software, and has also introduced a fundamentally different security reality, presenting new challenges to teams responsible for keeping environments secure. Designed to be dynamic, cloud environments can be in a near-constant state of change, with infrastructure resources spun up and down multiple times a day to support cloud applications. With each event, the building blocks of cloud infrastructure need to remain secure, but doing so is a big challenge for many organizations.

As applications have evolved from the monolithic approach to the microservices architectural pattern, API gateways have become responsible for API deployment, routing, security, and other tasks. An API gateway is an API management tool that sits between a client and a collection of backend services. An API gateway acts as a reverse proxy to accept all API calls, aggregate the various services required to fulfill them, and return the appropriate result. When used as part of a microservices architecture, an API gateway may be referred to as an "external API" to distinguish it from an "internal API" or API server implemented within a cluster of a container orchestration platform.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

SUMMARY

Figure 1:
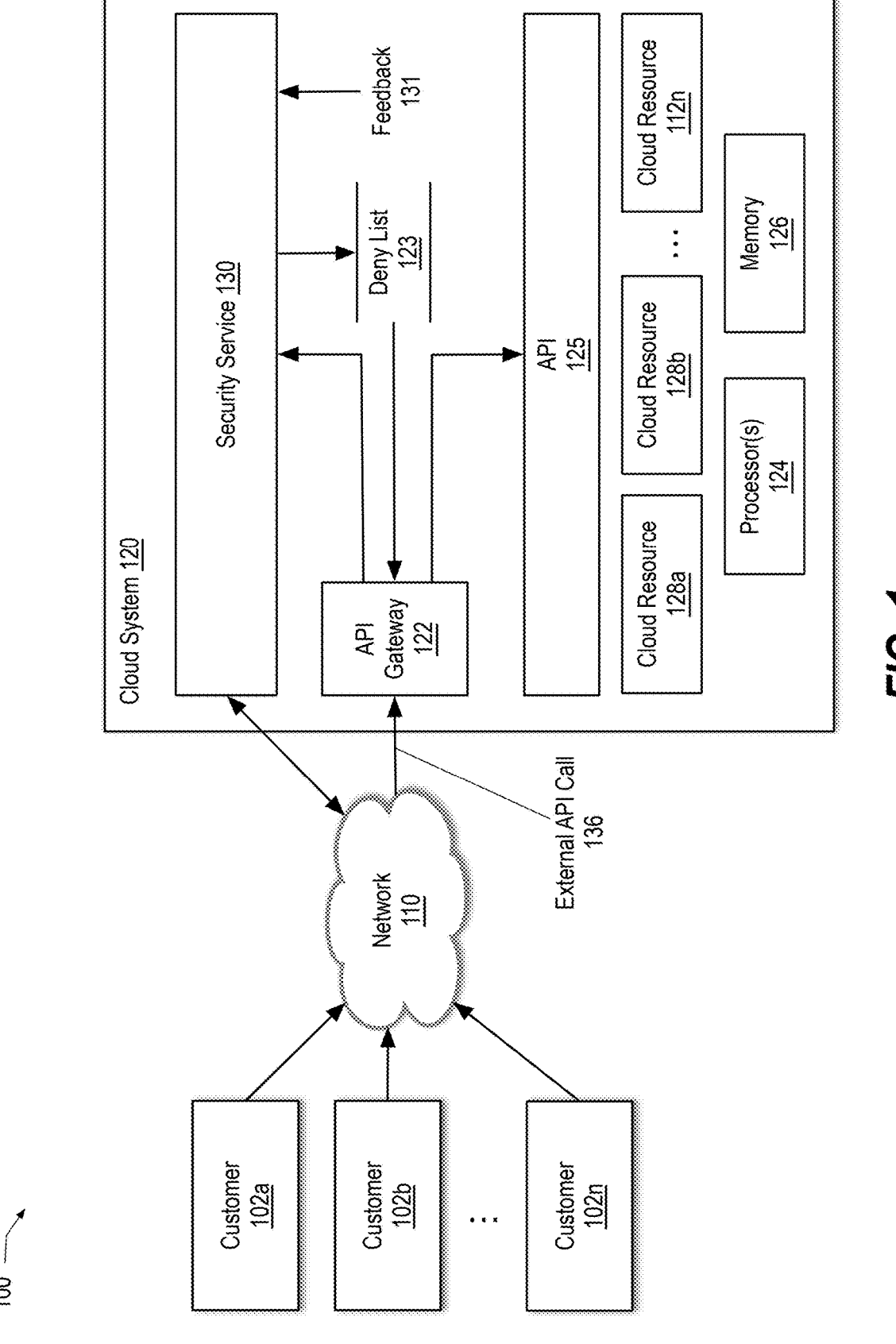
FIG. 1 is a block diagram illustrating a cloud environment according to some embodiments of the present disclosure.

Systems and methods are described for enhancing API security by identifying anomalous activities in a cloud computing environment. According to one embodiment, a master node of a cluster of a container orchestration platform determines an effect on the cluster of an internal application programming interface (API) call to an internal API of the cluster. The internal API call is issued responsive to an external API call made to an external API. A determination is made that the effect satisfies one or more criteria. After the determination, the external API or a network security deployment associated with the external API is caused to perform a security action on a subsequently received external API call having a same source Internet Protocol (IP) address, a same host, a same user, or a same portion of a payload as the external API call.

Other features of embodiments of the present disclosure will be apparent from accompanying drawings and detailed description that follows.

DETAILED DESCRIPTION

Systems and methods are described for enhancing API security by identifying anomalous activities in a cloud computing environment. Existing cloud security approaches generally focus on the performance of a set of simplistic security controls (e.g., rate limiting, input validation, detecting code injection, and the like) by an external API; however, such security controls are generally limited to evaluating payloads of external API calls and have no insight into potential effects and/or impacts such external API calls might have on the underlying application layer or cloud operations.

In some examples described herein the external API and the internal API may both reside within a container orchestration platform (e.g., Kubernetes, Amazon Elastic Container Service (ECS), Amazon Elastic Kubernetes Service (EKS), Red Hat OpenShift Container Platform, Google Kubernetes Engine (GKE), Azure Kubernetes Service (AKS), IBM Cloud Kubernetes Service, and the like). In other examples, due to the potential layering of multiple API gateways, the external API may refer to an API gateway (e.g., an AWS API gateway) of a public cloud provider, an authenticating API, for example, of an authentication provider, a representational state transfer (REST) API external to the container orchestration platform and/or external to the public cloud provider in which the container orchestration platform operates.

Various embodiments described herein seek to address or at least mitigate the lack of awareness of an external API with respect to how calls to the external API may affect a cluster of a container orchestration platform. According to one embodiment, the views of the external and internal APIs are combined to achieve better API security, for example, by correlating external API calls with undesirable behavior or other anomalies arising in the internal API. In one example, information (e.g., an originating host, a source internet protocol (IP) address, a user, and/or specific payloads) associated with a given external API call that results in unexpected behavior within a cluster, even though the external API call appears innocuous (e.g., within normal parameters) by itself, may be added to a network security feature (e.g., a deny list) utilized by the external API to facilitate performance of enhanced filtering by the external API on subsequently received requests by the external API. In another example, a network security deployment (e.g., a Network Intrusion Prevention System (NIPS) or a Web Application Firewall (WAF) implemented in the form of hardware and/or software) utilized by the external API may be configured with appropriate information regarding the offending external API call to enable such enhanced filtering.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

As used herein a "cloud," "cloud system," "cloud platform," and/or "cloud environment" broadly and generally refers to a platform through which cloud computing may be delivered via a public network (e.g., the Internet) and/or a private network. The National Institute of Standards and Technology (NIST) defines cloud computing as "a model for enabling ubiquitous, convenient, on-demand network access to a shared pool of configurable computing resources (e.g., networks, servers, storage, applications, and services) that can be rapidly provisioned and released with minimal management effort or service provider interaction." P. Mell, T. Grance, The NIST Definition of Cloud Computing, National Institute of Standards and Technology, USA, 2011. The infrastructure of a cloud may be deployed in accordance with various deployment models, including private cloud, community cloud, public cloud, and hybrid cloud. In the private cloud deployment model, the cloud infrastructure is provisioned for exclusive use by a single organization comprising multiple consumers (e.g., business units), may be owned, managed, and operated by the organization, a third party, or some combination of them, and may exist on or off premises. In the community cloud deployment model, the cloud infrastructure is provisioned for exclusive use by a specific community of consumers from organizations that have shared concerns (e.g., mission, security requirements, policy, and compliance considerations), may be owned, managed, and operated by one or more of the organizations in the community, a third party, or some combination of them, and may exist on or off premises. In the public cloud deployment model, the cloud infrastructure is provisioned for open use by the general public, may be owned, managed, and operated by a cloud provider (e.g., a business, academic, or government organization, or some combination of them), and exists on the premises of the cloud provider. The cloud service provider may offer a cloud-based platform, infrastructure, application, or storage services as-a-service, in accordance with a number of service models, including Software-as-a-Service (SaaS), Platform-as-a-Service (PaaS), and/or Infrastructure-as-a-Service (IaaS). In the hybrid cloud deployment model, the cloud infrastructure is a composition of two or more distinct cloud infrastructures (private, community, or public) that remain unique entities, but are bound together by standardized or proprietary technology that enables data and application portability (e.g., cloud bursting for load balancing between clouds).

As used herein "unexpected or anomalous behavior" within a cluster generally refers to behavior that deviates from what is considered standard, normal, or expected for the cluster. Non-limiting examples of unexpected or anomalous behavior include excessive resource utilization (e.g., memory, storage, and/or CPU utilization) by the cluster, utilization or creation of an excessive number of VM instances, utilization or creation of an excessive number of pod or container instantiations, resource utilization outside the historical norm by the cluster, utilization or creation of a number of VM instances outside the historical norm by the cluster, and utilization or creation of a number of pod or container instantiations outside the historical norm by the cluster. In various embodiments described herein, unexpected or anomalous behavior within a cluster may be identified based on application of predetermined or configurable thresholds, statistical analysis, machine-learning (ML), and/or heuristics (implemented within the cluster or external to the cluster.

As used herein a "security action" generally refers to an action that is undertaken to address or mitigate a potential or perceived security threat or anomaly. Non-limiting examples of security actions include blocking or dropping a call (or request made) to an external API, redirecting the request, logging the request, monitoring the request, and generating a notification or alert regarding the request.

Example Cloud Environment

FIG. 1 is a block diagram illustrating a cloud environment 100 according to some embodiments of the present disclosure. In the embodiments illustrated in FIG. 1, the cloud environment 100 may include, among other things, one or more customers 102a-n, a cloud system 120, and a network 110 through which the customers 102a-n and the cloud system 120 may communicate with each other. The network 110 may be, for example, the Internet, a local area network, a wide area network, and/or a wireless network (to name a few examples). The network 110 may include a variety of transmission media including cables, optical fibers, wireless routers, firewalls, switches, gateways, and/or other devices to facilitate communications between one or more of the aspects of the environment 100.

Cloud system 120 may be a cloud environment made accessible by a provider of cloud infrastructure for one or more customers 102a-n. Cloud system 120 may provide a variety of cloud computing solutions, such as infrastructure as a service (IaaS), software as a service (SaaS), and/or platform as a service (PaaS) as some examples. For example, cloud system 120 may be a public cloud, non-limiting examples of which include Amazon Web Services (AWS), Microsoft Azure, and Google Cloud Platform (GCP). The cloud system 120 may represent a multi-tenant cloud hosting a variety of virtualization tools that customers 102a-n may request to host or otherwise run one or more applications (e.g., via the network 110). Alternatively, the cloud system 120 may represent a private cloud, such as an enterprise cloud for a given organization.

Cloud system 120, generally, may provide infrastructure including any set of resources used for executing one or more containers, virtual machines, or other hosted virtualization tools. Resources may include central processing unit (CPU) resources, memory resources, caching resources, storage space resources, communication capacity resources, etc. that a virtualization tool such as a container may use for execution of one or more workloads for customers 102a-n. These resources are illustrated in FIG. 1 as cloud resources 128a-n, of cloud system 120. These may represent any number of cloud resources in any of a variety of combinations. As just one example, the cloud resources 128a-n may be in the form of one or more compute instances (e.g., AWS Elastic Compute Cloud (EC2) instances), or other instance types from a cloud provider, for example, that are part of a cluster (not shown).

A given customer may make use of an external API (e.g., API gateway 122) as an entry point for client requests directed to an API 125 (an internal API, for example, exposed by an API server of a cluster) relating to the provided infrastructure or services (e.g., services offered by third-parties and/or by the cloud provider). The API gateway 122 may represent an API gateway managed and operated by the cloud provider and may be responsible for, among other things, acting as a single endpoint that client apps (not shown) use, redirecting the requests (e.g., Hypertext Transfer Protocol (HTTP) requests) received from the client apps to internal (micro)services that may be hosted by one or more of the cloud resources 128a-n. In this manner, only this one endpoint may be exposed to the outside world. The API gateway 122 may also aggregate responses from multiple microservices and send them back as one response, thereby reducing the number of calls that would otherwise be made by the client apps. Additionally, the API gateway 122 may log information regarding user activity and API usage within a cloud activity trace (not shown) that collects and stores audit records for API calls and perform various security controls, such as rate limiting, input validation, and blocking of requests that can result in an SQL injection attack or that might be part of a denial of service (DOS) attack, before redirecting the requests to API 125. Such security controls may be performed by the API gateway 122 or on behalf of the API gateway 122 by a security service 130. However, as noted above, at present, such security controls have no correlation to the application layer or underlying cloud operation and therefore are generally unaware of the impact a given call to the external API has or may have on a cluster of a container orchestration platform. Depending upon the particular cloud system, the API gateway 122 may be the Google Cloud API gateway, the Azure API gateway, the AWS API gateway, or the like. Other non-limiting examples of the API gateway 122 include the Kong Gateway, the Tyk Gateway, KrakenD, and Gloo Edge.

Cloud system 120 may further include one or more processor(s) 124, which may include a CPU, a digital signal processor (DSP), an application specific integrated circuit (ASIC), a controller, a field programmable gate array (FPGA) device, another hardware device, a firmware device, or any combination thereof configured to perform the operations described herein. The processor(s) 124 may also be implemented as a combination of computing devices, e.g., a combination of a DSP and a microprocessor, a plurality of microprocessors, one or more microprocessors in conjunction with a DSP core, or any other such configuration.

The processor(s) 124 may be connected to memory 126 to execute one or more instructions stored in the memory 124 by the processor(s) 114. The memory 126 may include a cache memory (e.g., a cache memory of a processor of the processor(s) 124), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 126 includes a non-transitory computer-readable medium. The memory 126 may store, or have recorded thereon, instructions. The instructions may include instructions that, when executed by a process of the processor(s) 124, cause the processor to perform the operations described herein with reference to one or more of (i) determining an impact on the cluster resulting from one or more internal API calls to an API server of the cluster that are triggered by an external API call made to an API gateway and (ii) when the impact satisfies one or more criteria, providing feedback to the API gateway or an associated network security deployment to facilitate performance of enhanced filtering by the API gateway or the associated network security deployment, for example, responsive to infrastructure-level events received via the API gateway 122. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

A customer 102a (or 102b-n, but referring to 102a for simplicity herein) may run one or more virtualization layers, such as virtual machines and/or containers on one or more cloud resources 128a-n of cloud system 120, via network 110. A container may use a level of system level virtualization, such as by packaging up application code and its dependencies (e.g., system tools, system libraries and/or settings, etc.) so that a hosted application can be executed reliably on one or more computing platforms of the cloud system 120 (as an example). Some examples of software may include, for example, Red Hat® OpenShift®, Docker® containers, chroot, Linux®-VServer, FreeBSD® Jails, HP-UX® Containers (SRP), VMware ThinApp®, etc. Containers may run on the cloud system 120 on a host operating system directly, or may be run via another layer of virtualization (such as within a virtual machine).

The security service 130 may ingests data from API gateway 122, API 125, cloud APIs, network traffic, and user activity to monitor cloud infrastructure events like access, utilization, and configuration changes. According to one embodiment, the security service 130 may maintain a deny list 123 to facilitate enhanced filtering of calls to API gateway 122 to block propagation of such calls to API 125 from potentially malicious hosts, IP addresses, and/or users or calls having payloads that have previously been identified as having an undesired effect, for example, on utilization of processor(s) 124 and/or memory 126 and/or operations of any of cloud resources 128a-n. For example, as described further below, responsive to feedback 131 received by or on behalf of a cluster controller (e.g., a Kubernetes cluster controller) regarding an impact on cloud resources 128a-n, resource utilization of processor(s) 124 or memory 126, and/or other indicators of unexpected or anomalous behavior, observed responsive to a particular call to the API 125, the security service 130 may add a source internet protocol (IP) address, a host, a user, and/or a specific request payload, associated with a client request received by the external API to the deny list 123. The deny list 123 may subsequently be used by the API gateway 122 to block specific traffic and/or perform other actions. In this manner, the views of the internal and external APIs may be combined to achieve better security than achievable from the external view alone.

In some embodiments, the security service 130 may make use of statistical analysis, heuristics, and/or machine learning (ML) to identify anomalous requests (or normal looking requests that result in unexpected or undesirable behavior) issued to the API gateway 122 and/or to the API 124. For example, statistical analysis may be used to calculate the mean and standard deviation of the size of request payloads observed. When a request is observed having a payload of a size that is outside of X standard deviations of the mean, such a request may be identified as anomalous and an appropriate filter (e.g., host, user, or source IP address) may be added to the deny list 123. Similarly, ML may be used to monitor time series data to identify/detect unexpected peaks and responsive thereto establish an appropriate filter.

The security service 130 may be provided to customers 102a-n alone or in addition to other services. For example, customers 102a-n may be provided with an orchestration service (not shown), allowing customers 102a-n to orchestrate one or more containers using the cloud resources

128a-n using an orchestrator (not shown). Orchestration may refer to scheduling containers within a predetermined set of available infrastructure represented by the cloud resources 128a-n. The orchestrator may be used to determine the required infrastructure based upon the needs of containers being executed/requested for execution. For example, orchestrator may map each container to a different set of cloud resources 128a-n, such as by selecting a set of containers to be deployed on each cloud resource 128a-n that is still available for use. Examples of such an orchestrator may include Kubernetes®, Docker Swarm®, AWS Elastic Container Service™, etc. Generally, it may refer to a container orchestrator that is executed on a host system of cloud system 120, such as via processor(s) 124 and memory 126, etc., using a host operating system. The orchestrator may further include a scheduler (not shown). The scheduler may be used to make an actual request for infrastructure and allocation of containers to the infrastructure to the cloud system 120. An example of a scheduler may include a Kubernetes® scheduler, which may execute on a host within network 110, either on the same hardware resources as the orchestrator or on other hardware and/or software resources.

While in the context of the present example, security service 130 is illustrated as a service running within cloud system 120, it is to be appreciated all or part of the security service 130 may alternatively be physically distinct from the cloud system 120, and may include its own processing and memory components to facilitate operation.

Example External API of a Cloud System

Figure 2:
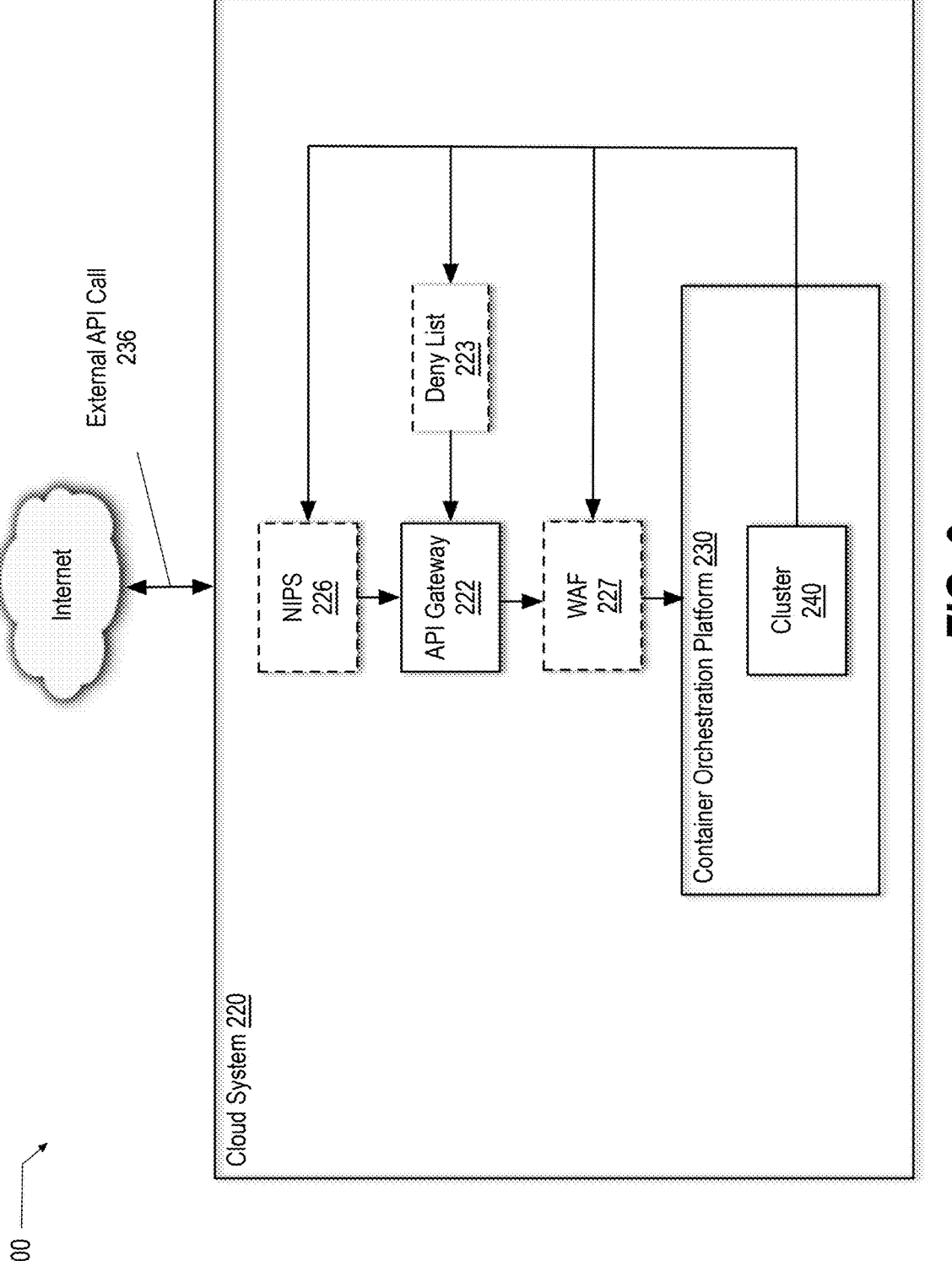
FIG. 2 is a block diagram illustrating an external API exposed by a cloud system that may drive an internal API of a cluster of a container orchestration platform in accordance with various embodiments of the present disclosure.

FIG. 2 is a block diagram illustrating an external API (e.g., API gateway 222) exposed by a cloud system 220 that may drive an internal API (not shown) of a cluster 240 of a container orchestration platform 230 in accordance with various embodiments of the present disclosure. In the context of the present example, the external API of the cloud system 220 (which may be analogous to cloud system 120) may make use of one or more security features (e.g., deny list 223, which may be analogous to deny list 123) and/or network security deployments (e.g., a NIPS 226 and web application firewall (WAF) 227) to filter external API calls (e.g., external API call 236), for example, received from external entities including, for example, customers 102a-n. The NIPS 226 and the WAF 227 may represent network security devices separate from the API gateway 222 (which may be analogous to API gateway 122) or may represent software implemented deployments running on the same or a different computer system as the API gateway 222. As noted above, the effectiveness of such security features and network security deployments is currently limited due to their lack of awareness or insight into potential effects and/or impacts such external API calls might have on the underlying application layer or cloud operations (e.g., unexpected or anomalous behavior within the cluster 240, for example, in the form of excessive resource utilization by the cluster 240 and/or pod or container instantiations outside the norm by the cluster 240). For example, existing network security deployments may perform various security controls, such as rate limiting, input validation, and blocking of requests that can result in an SQL injection attack or that might be part of a DOS attack; however, valid inputs (created with malicious intent or otherwise) may cause undesired effects within the cluster 240. For instance, an integer value may represent a valid input within the payload of an external API call to the API gateway 222, but when the integer value is propagated by the API gateway 222 to a corresponding internal API call to the cluster 240, the internal API call may result in undesired effects (e.g., creation of an excessive number of compute instances) under various conditions, for example, when the integer value is a particular value, is less than a first threshold, greater than a second threshold, and/or within a particular range of values.

To mitigate such limitations, in various embodiments described herein, the cluster 240 may establish new filters within the one or more security features, or otherwise provide feedback to or configure the API gateway and/or the associated network security deployments utilized thereby responsive to observation by the cluster 240 of unexpected or anomalous behavior, for example, based on application of predetermined or configurable thresholds, statistical analysis, machine-learning (ML), and/or heuristics (implemented within the cluster 240 or implemented external to the cluster, for example, within a separate security service (e.g., security service 130)).

In one embodiment, payload analysis may represent or be part of initial filtering that may be established. Such payload analysis may evolve into blocking the user, the host, and/or the source IP address if the same user, host, and/or source IP address is repeatedly associated with undesired effects within the cluster 240.

Example External and Internal APIs within a Container Orchestration Platform

Figure 3:
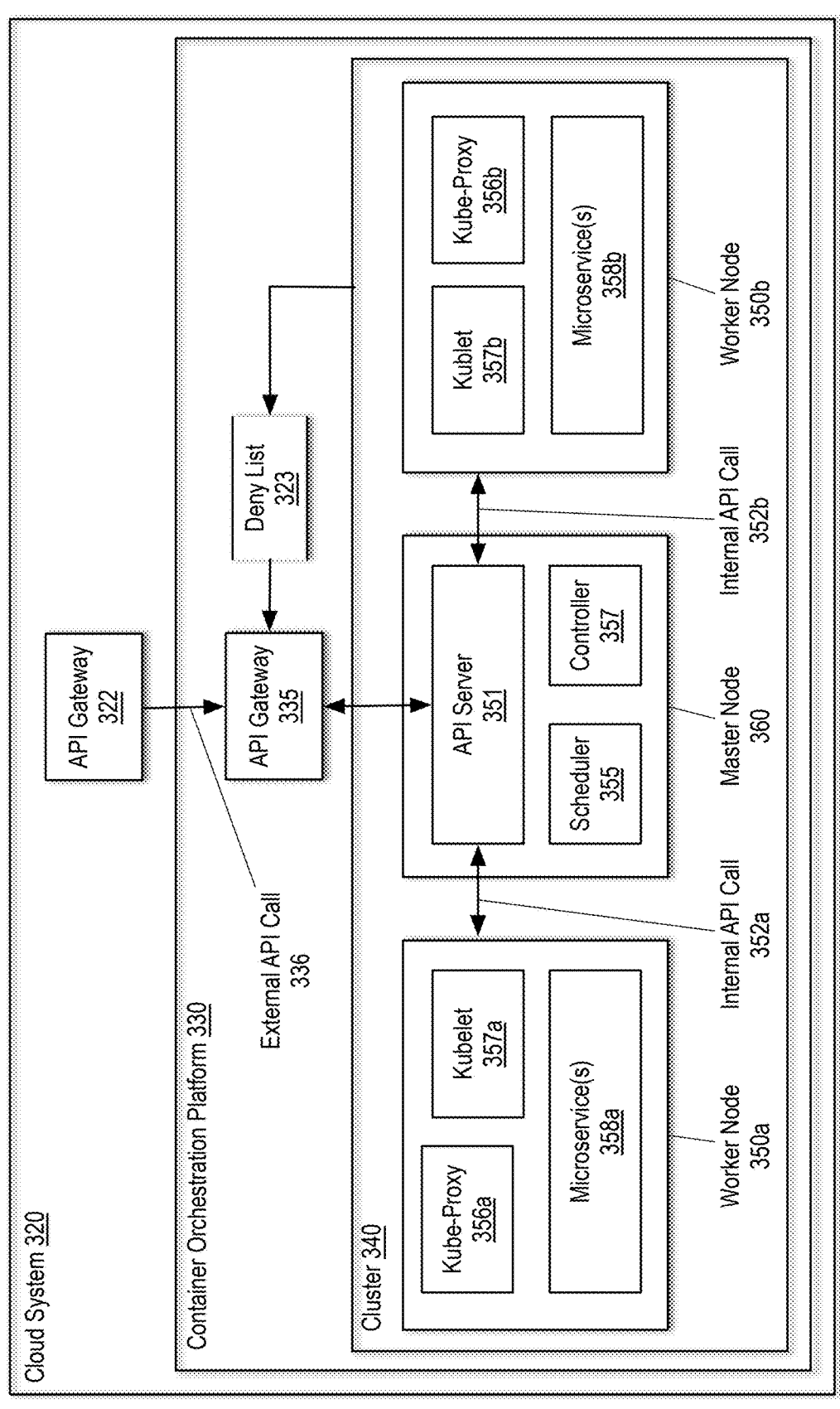
FIG. 3 is a block diagram illustrating an external API and an internal API of a container orchestration platform in accordance with various embodiments of the present disclosure.

FIG. 3 is a block diagram illustrating an external API (e.g., API gateway 335) and an internal API (e.g., API server 351) of a container orchestration platform 330 operable within a cloud system 320 in accordance with various embodiments of the present disclosure. In the context of the present example, the cloud system 320 (which may be analogous to cloud system 120 and/or 220) is shown including an API gateway 322 (which may be analogous to API gateway 122).

In the context of the present example, the container orchestration platform 330 (e.g., Kubernetes) includes an API gateway 335, which may represent a Kubernetes ingress controller, and a cluster 340. The cluster 340 is shown including a number of nodes, including a master node 360 and worker nodes 350a-b. The master node 360 may be a virtual machine or a physical machine and represents the control plane for the cluster 340. The master node 360 is generally responsible for controlling the cluster 340, its state data, and its configuration. In the present example, the master node is shown including an internal API (e.g., API server 351), a scheduler 355, and a controller 357.

The internal API (which may be analogous to API 125 of FIG. 1) provides an API that serves as the front end of the control plane. The internal API is generally responsible for handling external requests (e.g., an HTTP request representing an external API call 336) and internal requests (e.g., requests or internal API calls 352a-b originated by worker nodes 350a-b, respectively). In one embodiment, the API gateway 335 or a network security deployment (e.g., NIPS 226 or WAF 227) associated therewith may perform a security action (e.g., filter, block, redirect, log, monitor, and/or alert). For example, the API gateway 335 may consult a deny list (e.g., deny list 323, which may be analogous to deny list 123 or 223) and may block requests associated with a source IP address, a host, a user, and/or a specific payload in the deny list. Similarly, a network security deployment may block, redirect, log, and/or monitor the request and/or generate an alert regarding the request, for example, based on an attack pattern signature configured by or on behalf of the cluster 340. Other potential actions that may be taken by the internal API for such requests include alerting an administrative user or taking an action to mitigate, remediate, monitor, or otherwise respond to the anomalous behavior.

The scheduler 355 may be responsible for scheduling pods on specific nodes (e.g., worker nodes 350a-b) according to automated workflows and user-defined conditions.

Figure 5:
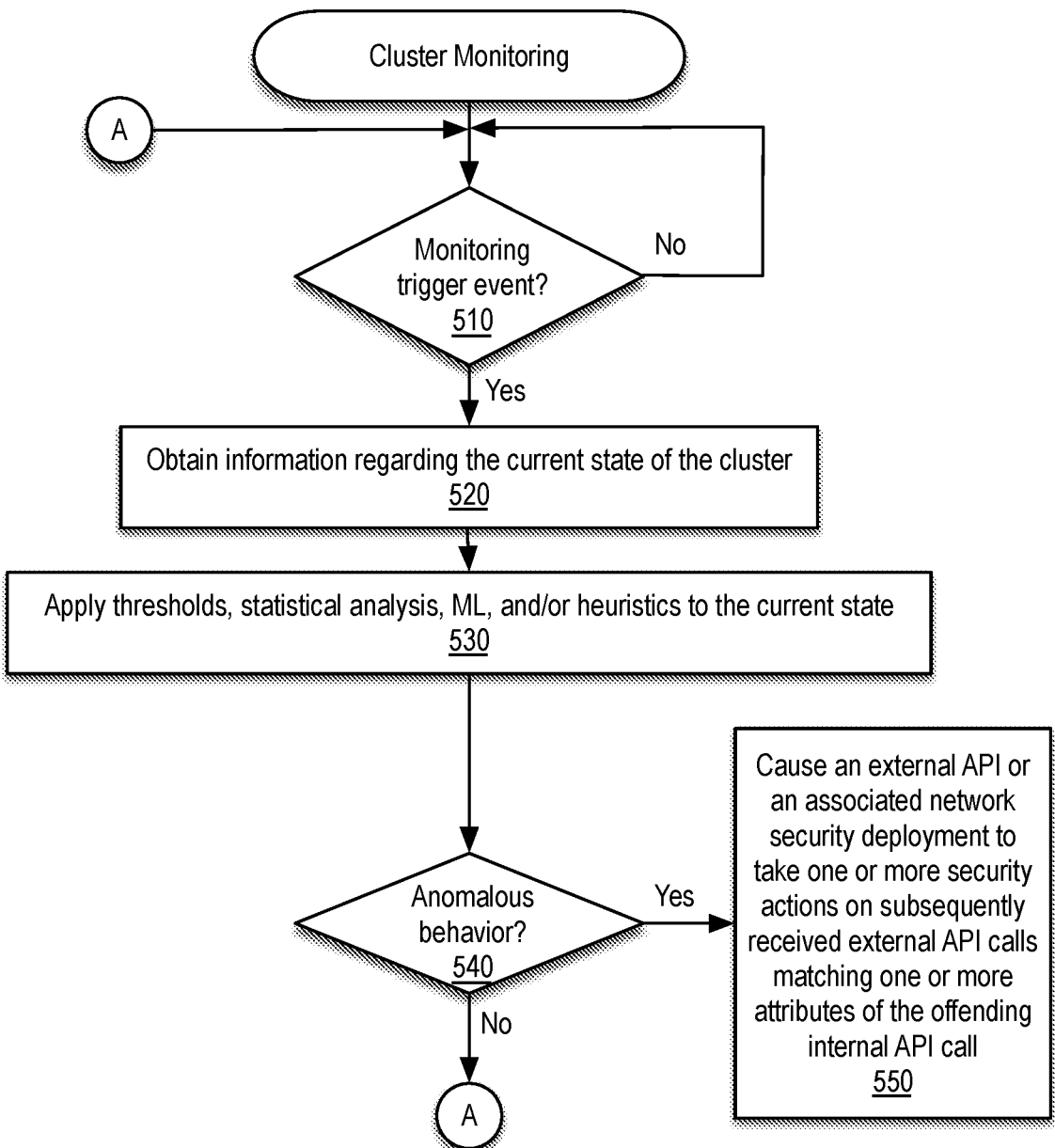
FIG. 5 is a flow diagram illustrating a set of operations for performing cluster monitoring in accordance with an embodiment of the present disclosure.

The controller 357 may implement a control loop that monitors and regulates the state of the cluster 340. The controller 357 may receive information about the current state of the cluster 340 and objects within it and send instructions to move the cluster 340 towards the cluster operator's desired state. According to one embodiment, as illustrated by FIG. 5, the controller 357 may make use of predetermined or configurable thresholds, statistical analysis, machine-learning (ML), and/or heuristics (implemented locally or implemented within a separate security service (e.g., security service 130)) to identify indicators of anomalous behavior (e.g., in terms of impact on cloud resources 128a-n and/or utilization of processor(s) 124 or memory 126). Non-limiting examples of unexpected or anomalous behavior include pod creation and/or container instantiation outside of normal or expected ranges, cluster CPU utilization beyond normal or expected ranges, and the like. Responsive to observing an impact on the cluster 340 satisfying one or more criteria, a correlation may be established between the external API call at issue (e.g., external API call 336) and the anomaly arising in the internal API. Additionally, the controller 357 may directly or indirectly add an entry to the deny list to cause API gateway 335 to block subsequently received requests matching the host, user, source IP address, and/or a portion of the payload of the external API call at issue. For example, the controller 357 may provide feedback (e.g., feedback 131) to the security service, thereby allowing the security service to configure the deny list appropriately for enhanced filtering of subsequent requests by the API gateway 335. In some embodiments, the controller 357 may directly or indirectly configure a network security deployment associated with the API gateway 335 to perform a particular security action, for example, by adding an attack pattern signature to the network security deployment.

As shown in FIG. 3, worker nodes 350a-b include respective Kube-proxies (e.g., Kube-proxy 356a-b), respective Kubelets (e.g., Kubelets 357a-b), and respective microservices (e.g., microservice(s) 358a-b) to which or from which internal API calls 325a-b may be made.

While in the context of the present example, only a single external API (e.g., API gateway 335) is shown within the container orchestration platform 330 and only a single API gateway 322 is shown within the cloud system 320, it is to be appreciated either or both of the API gateways 322 and 335 may represent one of multiple API gateways that may handle client requests within the cloud system 320 and the container orchestration platform 330, respectively. For example, API gateway 335 may be part of federated gateway including a hierarchy of multiple API gateways some of which may be used for accessing groups of microservices (e.g., microservice(s) 358a and/or microservice(s) 358b).

Although in the context of the present example, the deny list 323 and network security deployments are described as being associated with the API gateway 335, they may alternatively be associated with the API gateway 322 or a separate deny list (e.g., deny list 123 or 223) and one or more separate network security deployments may be associated with API gateway 322.

Example External API processing

Figure 4:
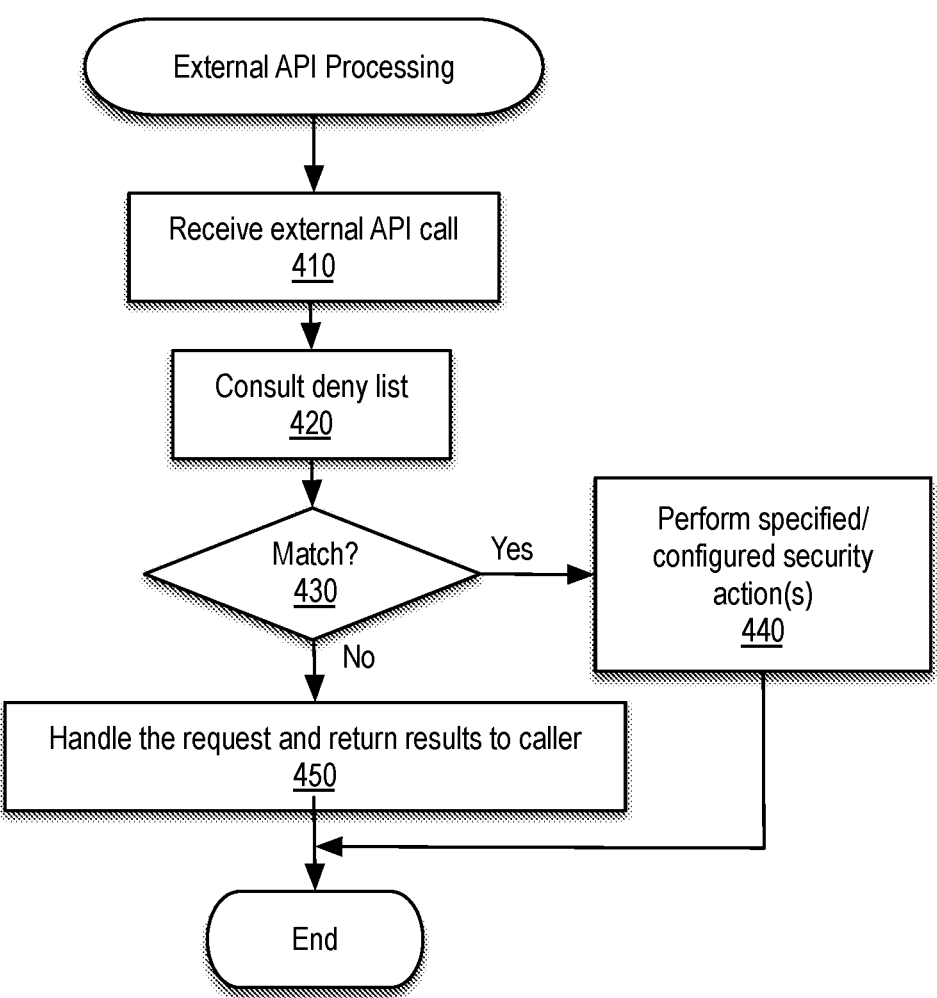
FIG. 4 is a flow diagram illustrating a set of operations for performing external API processing in accordance with an embodiment of the present disclosure.

FIG. 4 is a flow diagram illustrating a set of operations for performing external API processing in accordance with an embodiment of the present disclosure. The external API processing described with reference to FIG. 4 may be performed by an API gateway (e.g., API gateway 122, 222, 322, and/or 335).

At block 410, an external API call (e.g., external API call 136, 236 or 336) is received by an external API (e.g., API gateway 122, 222, 322, or 335).

At block 420, a deny list (e.g., deny list 123, 223, or 323) may be consulted by the external API.

At decision block 430, a determination is made regarding whether the external API call includes one or more attributes (e.g., a host, a user, a source IP address, and/or a portion of a payload) that match an entry in the deny list. If so, processing branches to block 440; otherwise, processing continues with block 450.

At block 440, a specified/configured security action may be taken by the external API gateway. For example, if the security action corresponding to the matching entry indicates matching requests are to be blocked, the external API call will be dropped and will not propagate further (e.g., will not trigger associated internal API calls, such as internal API calls 352*a-b*, to an internal API (e.g., API server 351)). Similarly, if the security action corresponding to the matching entry indicates matching requests are to be redirected, the external API call may be redirected to a monitoring cluster where further analysis of the external API call may be performed. Additionally or alternatively, the matching entry may also indicate one or more further security actions, such as logging or alerting, are to be performed.

At block 450, the external API call is handled in accordance with normal operations. For example, the external API call may call for the externa API call to be propagated as a downstream external API call (e.g., external API call 336) and/or the invocation of one or more internal API calls (e.g., internal API calls 352*a-b*) to an internal API (e.g., API server 351).

While in the context of the present example, the filtering of external API calls and performance of associated security actions is described as being taken by the external API, it is to be appreciated in other examples, a network security deployment, for instance, a NIPS (e.g., NIPS 226) or a WAF (e.g., WAF 227) may scan the network traffic against configured attack patterns and perform one or more corresponding security actions.

Example Cluster Monitoring

FIG. 5 is a flow diagram illustrating a set of operations for performing cluster monitoring in accordance with an embodiment of the present disclosure. The cluster monitoring described with respect to FIG. 5 may be performed by a controller (e.g., controller 357) of a master node (e.g., master node 360) of a cluster (e.g., cluster 340).

At decision block 510, a determination is made regarding whether a monitoring trigger event has occurred. If so, processing continues with block 520; otherwise, processing loops back to decision block 510. The monitoring trigger event may be receipt of a call to an internal API server (e.g., API server 351) of the cluster or completion of processing of the call, thereby causing an evaluation of the current state of the cluster for every call. Alternatively, monitoring trigger event may be expiration of a predetermined or configurable timer that controls the interval at which cluster monitoring is performed.

At block 520, information regarding the current state of the cluster is obtained. For example, the controller may determine one or more of how many instances (e.g., worker nodes 350*a-b*) have been created, how may pods or containers have been created, a change in CPU and/or memory resource utilization responsive to the internal API call at issue or since the last monitoring cycle, a current resource CPU and/or memory resource utilization, and the like.

At block 530, predetermined or configurable thresholds, statistical analysis, ML, and/or heuristics may be applied to the current state, for example, with respect to characteristics at the cluster-level, the container-level, the pod-level, and/or a combination thereof.

At decision block 540, a determination is made regarding whether the application of the predetermined or configurable thresholds, statistical analysis, ML, and/or heuristics to the current state of the cluster is indicative of anomalous behavior. If so, processing branches to block 550; otherwise processing loops back to decision block 510. According to one embodiment, the determination involve evaluation of a set of one or more criteria and determining whether various aspects of the current state of the cluster satisfy the one or more criteria. As a non-limiting example, an internal API call that results in creation of an unexpected number (e.g., meeting or exceeding a predetermined or configurable threshold) of instances, pods, or containers, may be considered anomalous behavior.

At block 550, the controller directly or indirectly (e.g., via feedback 131) causes an external API (e.g., API gateway 122, 222, 322, or 335) or a network security deployment associated therewith to take one or more security actions on subsequently received external API calls having one or more attributes (e.g., a host, a user, a source IP address, a portion of a payload) matching that of the internal API call deemed to have caused the impact or effect at issue on the cluster. For example, the controller may add an entry to a deny list (e.g., deny list 123, 223, or 323) to cause the external API to block subsequently received external API calls matching one or more aspects of the entry or may configure a network security deployment (e.g., an IPS or a WAF) associated with the external API to perform one or more security actions on subsequently received external API calls matching a signature pattern generated based on the internal API call at issue.

While in the context of FIGS. 4 and 5, a number of enumerated blocks are included, it is to be understood that other examples may include additional blocks before, after, and/or in between the enumerated blocks. Similarly, in some examples, one or more of the enumerated blocks may be omitted and/or performed in a different order.

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 6:
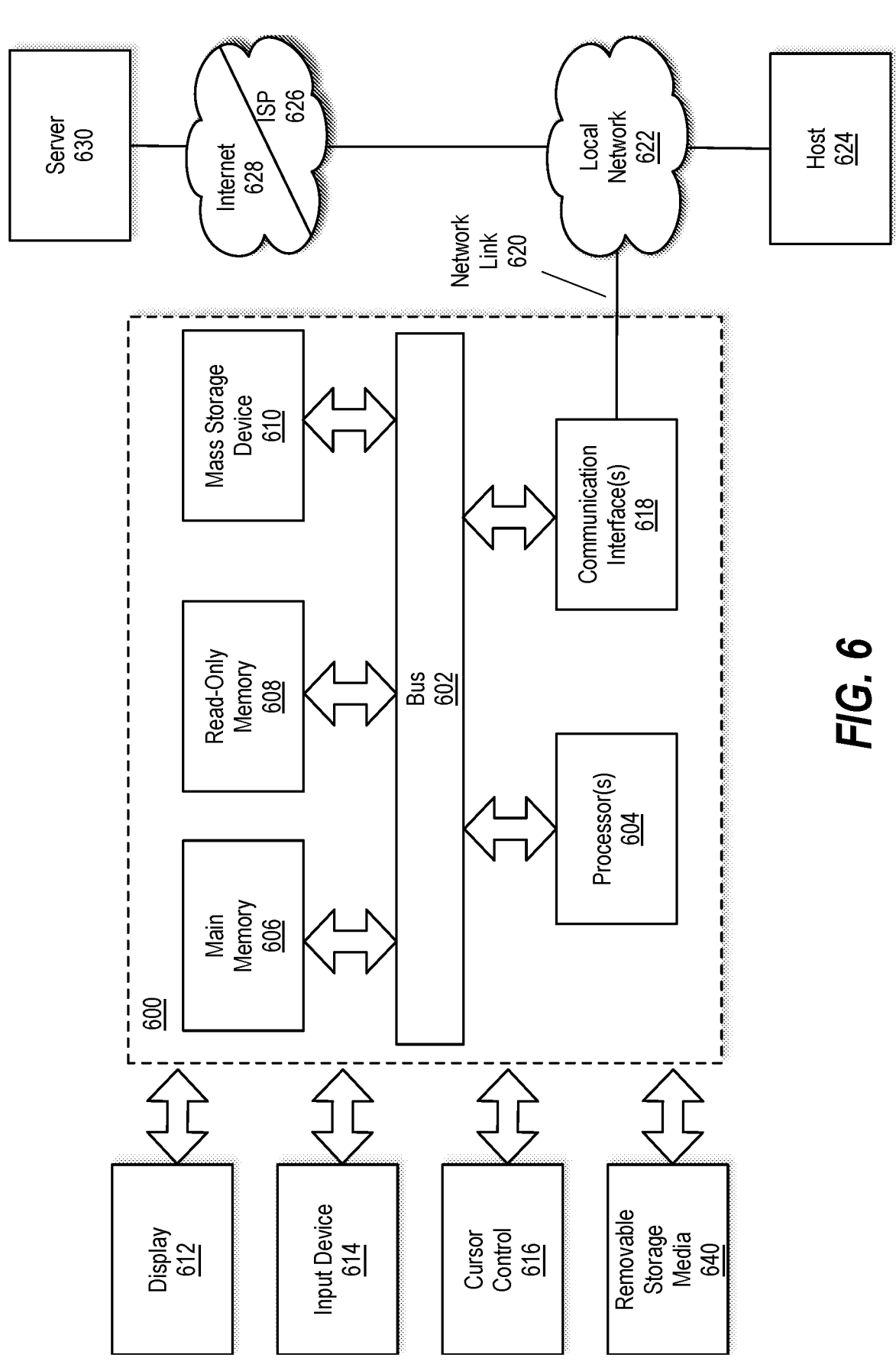
FIG. 6 illustrates an example computer system in which or with which embodiments of the present disclosure may be utilized.

FIG. 6 is a block diagram that illustrates a computer system 600 in which or with which an embodiment of the present disclosure may be implemented. Computer system 600 may serve as an example of all or a portion of the computing resources of a physical machine representing a node (e.g., one of worker nodes 350*a-b* and/or master node 360) of a container orchestration platform cluster (e.g., cluster 340) or hosting a virtual machine representing such a node. Notably, components of computer system 600 described herein are meant only to exemplify various possibilities. In no way should example computer system 600 limit the scope of the present disclosure. In the context of the present example, computer system 600 includes a bus 602 or other communication mechanism for communicating information, and a processing resource (e.g., a hardware processor 604) coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, e.g., a magnetic disk, optical disk or flash disk (made of flash memory chips), is provided and coupled to bus 602 for storing information and instructions.

Computer system 600 may be coupled via bus 602 to a display 612, e.g., a cathode ray tube (CRT), Liquid Crystal Display (LCD), Organic Light-Emitting Diode Display (OLED), Digital Light Processing Display (DLP) or the like, for displaying information to a computer user. An input device 614, including alphanumeric and other keys, is coupled to bus 602 for communicating information and command selections to processor 604. Another type of user input device is cursor control 616, such as a mouse, a trackball, a trackpad, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Removable storage media 640 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 600 may implement the techniques described herein using customized hard-wired logic, one or more ASICs or FPGAs, firmware or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 610. Volatile media includes dynamic memory, such as main memory 606. Common forms of storage media include, for example, a flexible disk, a hard disk, a solid state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622.

For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, or stored in storage device 610, or other non-volatile storage for later execution.

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

All examples and illustrative references are non-limiting and should not be used to limit the applicability of the proposed approach to specific implementations and examples described herein and their equivalents. For simplicity, reference numbers may be repeated between various examples. This repetition is for clarity only and does not dictate a relationship between the respective examples. Finally, in view of this disclosure, particular features described in relation to one aspect or example may be applied to other disclosed aspects or examples of the disclosure, even though not specifically shown in the drawings or described in the text.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A non-transitory machine readable medium storing instructions, which when executed by one or more processing resources of a cluster of a container orchestration platform, cause the cluster to:

determine, by a master node of the cluster, an impact on the cluster resulting from one or more internal application programming interface (API) calls to an API server of the cluster, wherein the one or more internal API calls are associated with an external API call made to an API gateway;

determine the impact satisfies one or more criteria; and after the determining the impact satisfies the one or more criteria, facilitate performance of enhanced filtering by the API gateway by providing feedback to the API gateway, wherein the feedback comprises inclusion of a source Internet Protocol (IP) address associated with the external API call on a deny list in which the deny list contains one or more IP addresses from which subsequent external API calls are to be blocked by the API gateway.

2. The non-transitory machine readable medium of claim 1, wherein the API gateway comprises an ingress controller associated with the container orchestration platform.

3. The non-transitory machine readable medium of claim 1, wherein the API gateway is associated with a cloud provider in which the container orchestration platform is running.

4. The non-transitory machine readable medium of claim 3, wherein the API gateway includes one or more of a web application firewall (WAF) deployment and an intrusion prevention system (IPS) deployment.

5. A method comprising:

determining, by a master node of a cluster of a container orchestration platform, an impact on the cluster resulting from one or more internal application programming interface (API) calls to an API server of the cluster, wherein the one or more internal API calls are associated with an external API call made to an API gateway;

determining, by the master node, the impact satisfies one or more criteria; and after the determining the impact satisfies the one or more criteria, facilitating, by the master node, performance of enhanced filtering by the API gateway by providing feedback to the API gateway, wherein the feedback comprises one or more of:

inclusion of a source Internet Protocol (IP) address associated with the external API call on a deny list in which the deny list contains one or more IP addresses from which subsequent external API calls are to be blocked by the API gateway;

inclusion of information regarding a host or a user associated with the external API call on the deny list in which the deny list identifies one or more hosts or users from which subsequent external API calls are to be blocked by the API gateway; or inclusion of content from a payload associated with the external API call on the deny list in which the deny list contains content from one or more payloads that when received as part of subsequent external API calls are to be blocked by the API gateway.

6. The method of claim 5, wherein the API gateway comprises an ingress controller associated with the container orchestration platform.

7. The method of claim 5, wherein the API gateway is associated with a cloud provider in which the container orchestration platform is running.

8. The method of claim 7, wherein the API gateway includes one or more of a web application firewall (WAF) deployment and an intrusion prevention system (IPS) deployment.

9. A system comprising:

one or more processing resources;

instructions that when executed by the one or more processing resources, cause the system to:

determining, by a master node of a cluster of a container orchestration platform, an impact on the cluster resulting from one or more internal application programming interface (API) calls to an API server of the cluster, wherein the one or more internal API calls are associated with an external API call made to an API gateway;

determining, by the master node, the impact satisfies one or more criteria; and after the determining the impact satisfies the one or more criteria, facilitating, by the master node, performance of enhanced filtering by the API gateway by providing feedback to the API gateway, wherein the feedback comprises one or more of:

inclusion of a source Internet Protocol (IP) address associated with the external API call on a deny list in which the deny list contains one or more IP addresses from which subsequent external API calls are to be blocked by the API gateway;

inclusion of information regarding a host or a user associated with the external API call on the deny list in which the deny list identifies one or more hosts or users from which subsequent external API calls are to be blocked by the API gateway; or inclusion of content from a payload associated with the external API call on the deny list in which the deny list contains content from one or more payloads that when received as part of subsequent external API calls are to be blocked by the API gateway.

10. The system of claim 9, wherein the API gateway comprises an ingress controller associated with the container orchestration platform.

11. The system of claim 9, wherein the API gateway is associated with a cloud provider in which the container orchestration platform is running.

12. The system of claim 11, wherein the API gateway includes one or more of a web application firewall (WAF) deployment and an intrusion prevention system (IPS) deployment.

13. A non-transitory machine readable medium storing instructions, which when executed by one or more processing resources of a cluster of a container orchestration platform, cause the cluster to:

determine, by a master node of the cluster, an impact on the cluster resulting from one or more internal application programming interface (API) calls to an API server of the cluster, wherein the one or more internal API calls are associated with an external API call made to an API gateway;

determine the impact satisfies one or more criteria; and after the determining the impact satisfies the one or more criteria, facilitate performance of enhanced filtering by the API gateway by providing feedback to the API gateway, wherein the feedback comprises inclusion of information regarding a host or a user associated with the external API call on a deny list in which the deny list identifies one or more hosts or users from which subsequent external API calls are to be blocked by the API gateway.

14. The non-transitory machine readable medium of claim 13, wherein the API gateway comprises an ingress controller associated with the container orchestration platform.

15. The non-transitory machine readable medium of claim 13, wherein the API gateway is associated with a cloud provider in which the container orchestration platform is running.

16. The non-transitory machine readable medium of claim 15, wherein the API gateway includes one or more of a web application firewall (WAF) deployment and an intrusion prevention system (IPS) deployment.

17. A non-transitory machine readable medium storing instructions, which when executed by one or more processing resources of a cluster of a container orchestration platform, cause the cluster to:

determine, by a master node of the cluster, an impact on the cluster resulting from one or more internal application programming interface (API) calls to an API server of the cluster, wherein the one or more internal API calls are associated with an external API call made to an API gateway;

determine the impact satisfies one or more criteria; and after the determining the impact satisfies the one or more criteria, facilitate performance of enhanced filtering by the API gateway by providing feedback to the API gateway, wherein the feedback comprises inclusion of content from a payload associated with the external API call on a deny list, wherein the deny list contains content from one or more payloads that when received as part of subsequent external API calls are to be blocked by the API gateway.

18. The non-transitory machine readable medium of claim 17, wherein the API gateway comprises an ingress controller associated with the container orchestration platform.

19. The non-transitory machine readable medium of claim 17, wherein the API gateway is associated with a cloud provider in which the container orchestration platform is running.

20. The non-transitory machine readable medium of claim 19, wherein the API gateway includes one or more of a web application firewall (WAF) deployment and an intrusion prevention system (IPS) deployment.

* * * * *